(12) United States Patent
Onodera et al.

(10) Patent No.: US 11,626,593 B2
(45) Date of Patent: Apr. 11, 2023

(54) NEGATIVE ELECTRODE FOR NON-AQUEOUS ELECTROLYTE SECONDARY BATTERY, AND NON-AQUEOUS ELECTROLYTE SECONDARY BATTERY

(71) Applicants: Panasonic Corporation, Kadoma (JP); TOYOTA JIDOSHA KABUSHIKI KAISHA, Toyota (JP)

(72) Inventors: Naoto Onodera, Hyogo (JP); Katsunori Yanagida, Hyogo (JP); Yo Kato, Nagoya (JP)

(73) Assignees: PANASONIC HOLDINGS CORPORATION, Kadoma (JP); TOYOTA JIDOSHA KABUSHIKI KAISHA, Toyota (JP)

(*) Notice: Subject to any disclaimer, the term of this patent is extended or adjusted under 35 U.S.C. 154(b) by 293 days.

(21) Appl. No.: 17/124,589

(22) Filed: Dec. 17, 2020

(65) Prior Publication Data

US 2021/0194009 A1 Jun. 24, 2021

(30) Foreign Application Priority Data

Dec. 23, 2019 (JP) .............................. JP2019-231335

(51) Int. Cl.
| | |
|---|---|
| *H01M 4/133* | (2010.01) |
| *H01M 4/583* | (2010.01) |
| *H01M 4/66* | (2006.01) |
| *H01M 4/36* | (2006.01) |
| *H01M 4/38* | (2006.01) |
| *H01M 4/62* | (2006.01) |
| *H01M 10/0525* | (2010.01) |
| *H01M 4/134* | (2010.01) |
| *H01M 4/02* | (2006.01) |

(52) U.S. Cl.
CPC .......... *H01M 4/661* (2013.01); *H01M 4/133* (2013.01); *H01M 4/134* (2013.01); *H01M 4/364* (2013.01); *H01M 4/366* (2013.01); *H01M 4/386* (2013.01); *H01M 4/624* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2016/0351892 A1* 12/2016 Sugimori .............. H01M 4/483

FOREIGN PATENT DOCUMENTS

JP 2009-266705 A 11/2009

* cited by examiner

*Primary Examiner* — Yoshitoshi Takeuchi
(74) *Attorney, Agent, or Firm* — WHDA, LLP

(57) ABSTRACT

This negative electrode comprises an electrode current collector, and an electrode mixture layer provided on a surface of the electrode current collector. When, with respect to the thickness direction of the electrode mixture layer, a range from the surface on the side of the electrode current collector to 40% of the thickness of the electrode mixture layer is defined as a first region, and a range from the surface on the side opposite to the electrode current collector to 40% of the thickness of the electrode mixture layer is defined as a second region, the first region and the second region have different volume change ratio upon charge and discharge, and the region having the larger volume change ratio upon charge and discharge has a higher content of a solid inorganic filler and a lower content of a hollow inorganic filler than the region having the smaller volume change ratio.

6 Claims, 2 Drawing Sheets

NEGATIVE ELECTRODE FOR NON-AQUEOUS ELECTROLYTE SECONDARY BATTERY, AND NON-AQUEOUS ELECTROLYTE SECONDARY BATTERY

CROSS REFERENCE TO RELATED APPLICATION

The entire disclosure of Japanese Patent Application No. 2019-231335 filed on Dec. 23, 2019 including the specification, claims, drawings, and abstract is incorporated herein by reference in its entirety.

TECHNICAL FIELD

The present disclosure relates to a negative electrode for a non-aqueous electrolyte secondary battery, and a non-aqueous electrolyte secondary battery.

BACKGROUND

With respect to negative electrode active materials. Sn, Si. and oxides thereof, have attracted attention recently as high energy density materials. Patent Literature 1 discloses a negative electrode in which, in order to make the capacity larger and suppress an internal short circuit of a secondary battery, a compound layer including Sn, Si or an oxide thereof is provided on a negative electrode current collector, and a carbon material layer including graphite is further provided on the compound layer.

However, when a negative electrode mixture layer has a two-layer structure, the upper layer and the lower layer each repeat expansion and contraction at a different volume change ratio due to repeated charge and discharge. Thus, the concentration of the electrolyte may become nonuniform in the negative electrode mixture layer. Especially when high-speed charge and discharge is repeated, the non-uniformity of the electrolyte becomes notable. As a result, the battery resistance may increase. In Patent Literature 1, the non-uniformity of the electrolyte is not taken into account. In view of suppression of deterioration in high-speed charge-discharge cycle characteristics, the technique of Patent Literature 1 is still required to be improved.

CITATION LIST

Patent Literature

PATENT LITERATURE 1: Japanese Unexamined Patent Application Publication No. 2009-266705

SUMMARY

Technical Problem

Therefore, it is an advantage of the present disclosure to provide a negative electrode in which deterioration in high-speed charge-discharge cycle characteristics is suppressed.

Solution to Problem

A negative electrode for a non-aqueous electrolyte secondary battery as one aspect of the present disclosure comprises a negative electrode current collector and a negative electrode mixture layer provided on a surface of the negative electrode current collector. The negative electrode mixture layer includes at least graphite particles, a solid inorganic filler, and a hollow inorganic filler. When, with respect to the thickness direction of the negative electrode mixture layer, a range from the surface on the side of the negative electrode current collector to 40% of the thickness of the negative electrode mixture layer is defied aa first region, and a range from the surface on the side opposite to the negative electrode current collector to 40% of the thickness of the negative electrode mixture layer is defined as a second region, the first region and the second region have different volume change ratio upon charge and discharge, and in the first region and the second region, the region having the higher volume change ratio upon charge and discharge has a higher content of the solid inorganic filler and a lower content of the hollow inorganic filler than the region having the lower volume change ratio upon charge and discharge.

A non-aqueous electrolyte secondary battery as one aspect of the present disclosure comprises the negative electrode for a non-aqueous electrolyte secondary battery described above, a positive electrode, and a non-aqueous electrolyte.

Advantageous Effects of Invention

According to one aspect of the present disclosure, increase in battery resistance due to repeated high-speed charge and discharge may be suppressed.

BRIEF DESCRIPTION OF DRAWINGS

Embodiment(s) of the present disclosure will be described based on the following figures, wherein.

DESCRIPTION OF EMBODIMENTS

Figure 1:
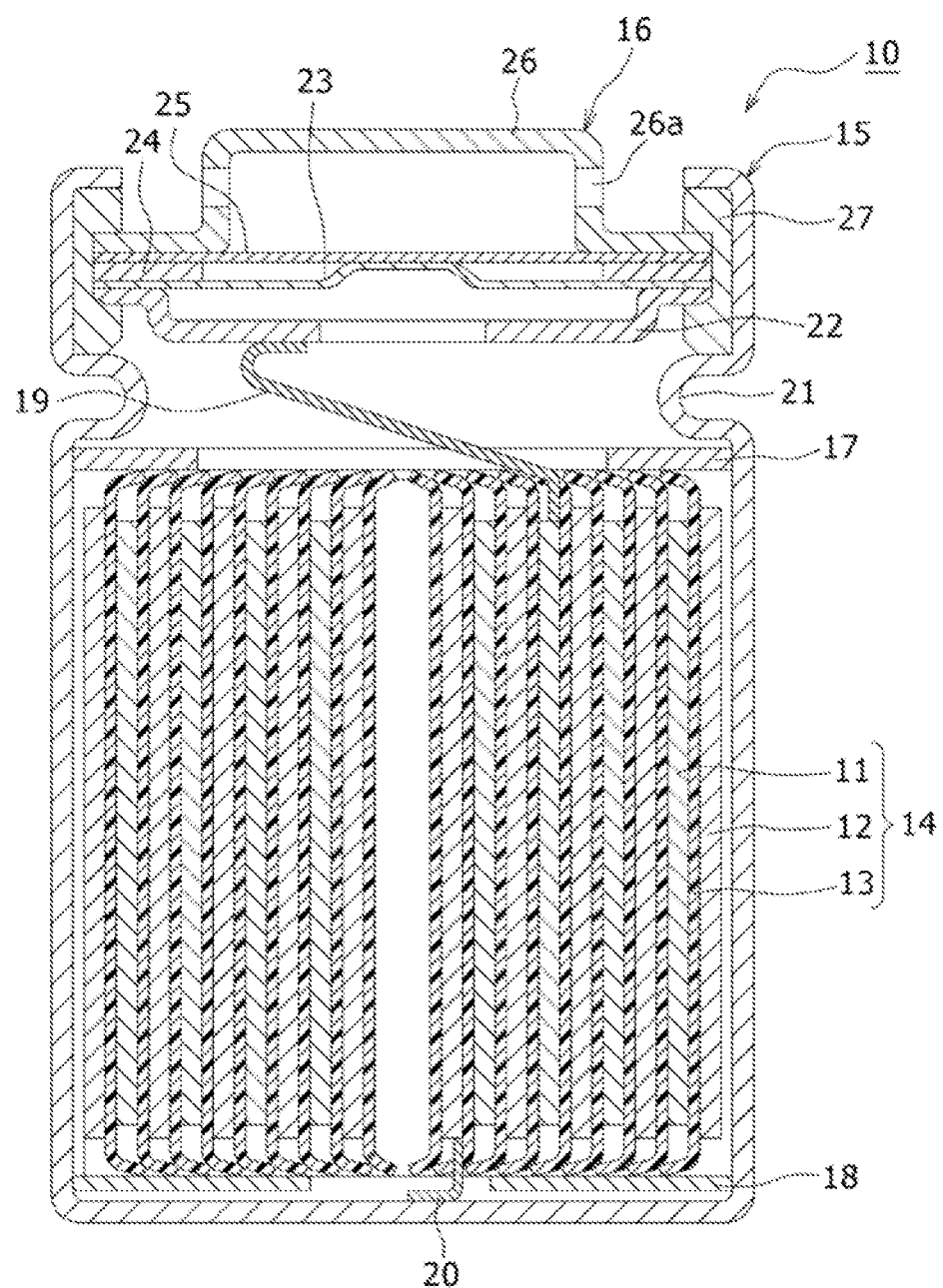
FIG. 1 is a longitudinal sectional view of a cylindrical secondary battery of an exemplary embodiment.

As described above, in a secondary battery employing a negative electrode having a two-layer structure for a higher capacity, suppression of increase in the battery resistance due to high-speed charge and discharge is difficult with the conventional techniques. The present inventors have therefore conducted intensive studies, and as a result, have found that deterioration in high-speed charge-discharge cycle characteristics can be suppressed by causing a first region and a second region that have different volume change ratio upon charge and discharge, in a negative electrode mixture layer, to each contain a hollow inorganic filler and a solid inorganic filler at an appropriate proportion. This is presumably because, between the first region and the second region, the region having the higher volume expansion ratio is caused to contain a larger amount of the solid inorganic filler to thereby suppress exudation of the electrode from the negative electrode mixture layer upon charge, as a result of which the negative electrode mixture layer expands, and simultaneously, the region having the lower volume expansion ratio is caused to contain a larger amount of a hollow inorganic filler to thereby facilitate absorption of the electrolyte upon discharge, as a result of which the negative electrode mixture layer contracts. Accordingly, the present inventors have conceived of a non-aqueous electrolyte secondary battery having improved high-speed charge-discharge cycle characteristics, shown in the following aspects.

A negative electrode for a non-aqueous electrolyte secondary battery as one aspect of the present disclosure comprises a negative electrode current collector and a negative electrode mixture layer provided on a surface of the negative electrode current collector. The negative electrode mixture layer includes at least graphite particles, a solid inorganic filler, and a hollow inorganic filler. When, with respect to the thickness direction of the negative electrode mixture layer, a range from the surface on the side of the negative electrode current collector to 40% of the thickness of the negative electrode mixture layer is defined as a first region, and a range from the surface on the side opposite to the negative electrode current collector to 40% of the thickness of the negative electrode mixture layer is defined as a second region, the first region and the second region have different volume change ratio upon charge and discharge, and in the first region and the second region, the region having the higher volume change ratio upon charge and discharge has a higher content of the solid inorganic filler and a lower content of the hollow inorganic filler than the region having the lower volume change ratio upon charge and discharge.

Hereinafter, an exemplary embodiment of a cylindrical secondary battery according to the present disclosure will be described in detail with reference to drawings. Specific shapes, materials, numeric values, directions, and the like in the description below are exemplary for the purpose of facilitating the understanding of the present invention, and may be appropriately changed in accordance with the specification of the cylindrical secondary battery. The exterior body is not limited to being cylindrical and may be rectangular or the like. In the following description, when a plurality of embodiments and modifications is included, use of characterizing portions thereof in an appropriate combination has been originally contemplated.

FIG. 1 is a longitudinal sectional view of a cylindrical secondary battery 10 of an exemplar) embodiment. In the secondary battery 10 shown in FIG. 1, an electrode assembly 14 and a non-aqueous electrolyte (not shown) are housed in an exterior body 15. The electrode assembly 14 has a wound structure in which a positive electrode 11 and a negative electrode 12 are wound together with a separator 13 therebetween. In the description below, for convenience of description, the side of a sealing assembly 16 is defined as the "topside", and the bottom side of the exterior body 15 is defined as the "underside".

The opening end of the exterior body 15 is closed with the sealing assembly 16 to seal the interior of the secondary battery 10. Insulating plates 17 and 18 are each provided above and under the electrode assembly 14. A positive electrode lead 19 extends upward through a through-hole in the insulating plate 17 and is welded to the lower surface of a filter 22, which is the bottom plate of the sealing assembly 16. In the secondary battery 10, a cap 26, which is the top plate of the sealing assembly 16 electrically connected to the filter 22, serves as a positive electrode terminal. Meanwhile, a negative electrode lead 20 extends through a through-hole of the insulating plate 18 to the bottom side of the exterior body 15 and is welded on the inner surface of the bottom of the exterior body 15. In the secondary battery 10, the exterior body 15 serves as a negative electrode terminal. When the negative electrode lead 20 is disposed at a terminal end, the negative electrode lead 20 passes on the outside of the insulating plate 18, extends toward the bottom of the exterior body 15, and is welded on the inner surface of the bottom of the exterior body 15.

The exterior body 15 is, for example, a bottomed cylindrical metal exterior can. A gasket 27 is provided between the exterior body 15 and the sealing assembly 16 to ensure that the interior of the secondary battery 10 is tightly sealed. The exterior body 15 has a grooved portion 21 to support the sealing assembly 16, the grooved portion being formed by externally pressing the portion of the side wall, for example. The grooved portion 21 is preferably annularly formed along the peripheral direction of the exterior body 15, supporting the sealing assembly 16 by the upper surface thereof via the gasket 27.

The sealing assembly 16 has a filter 22, a lower vent member 23, an insulating member 24, an upper vent member 25, and a cap 26, stacked in the listed order sequentially from the side of the electrode assembly 14. Each of the members constituting the sealing assembly 16 has, for example, a disk or ring shape, and the members other than the insulating member 24 are electrically connected to each other. The lower vent member 23 and the upper vent member 25 are connected to each other at respective middle portions and the insulating member 24 is interposed between respective circumferences. When the internal pressure of the battery rises due to abnormal heat generation, the lower vent member 23, for example, ruptures to thereby cause the upper vent member 25 to bulge toward the side of the cap 26 and leave the lower vent member 23. Thus, the electrical connection therebetween is interrupted. If the internal pressure further increases, the upper vent member 25 ruptures to discharge gas through an opening 26a of the cap 26.

Hereinbelow, the positive electrode 11, the negative electrode 12, the separator 13, and the non-aqueous electrolyte constituting the secondary battery 10, particularly, a negative electrode mixture layer constituting the negative electrode 12, will be described in detail.

[Negative Electrode]

Figure 2:
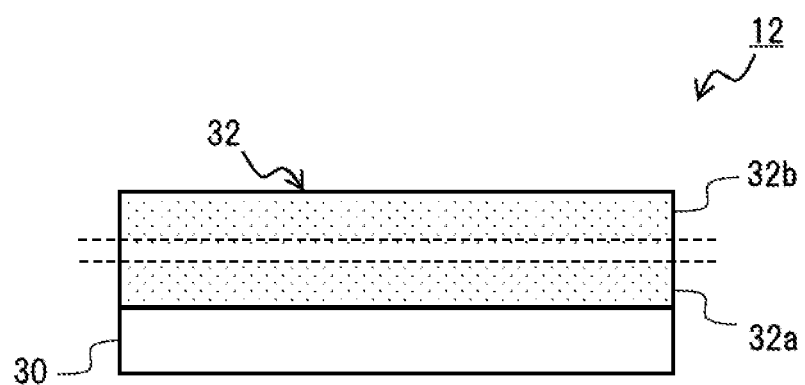
FIG. 2 is a sectional view of a negative electrode of an exemplary embodiment.

FIG. 2 is a sectional view of a negative electrode 12 of an exemplary embodiment. The negative electrode 12 includes a negative electrode current collector 30 and a negative electrode mixture layer 32 provided on a surface of the negative electrode current collector 30.

The negative electrode current collector 30 used here is, for example, foil of a metal, such as copper, which is stable in the electric potential range of the negative electrode, or a film in which such a metal is disposed on an outer layer. The thickness of the negative electrode current collector 30 is 5 μm to 30 μm, for example.

The negative electrode mixture layer 32 includes at least graphite particles, a solid inorganic filler, and a hollow inorganic filler. Examples of the graphite particles can include natural graphite and artificial graphite. The average particle size of the graphite particles (median diameter D50 by volume, the same applies hereinbelow) is preferably 5 μm to 30 μm, more preferably 8 μm to 20 μm. Each plane spacing ($d_{002}$) of the (002) plane with respect to the graphite particles, according to a wide-angle X-ray diffraction method, is, for example, preferably 0.3354 nm or more, more preferably 0.3357 nm or more, and preferably less than 0.340 nm, more preferably 0.338 nm or less. Each crystallite size (Lc(002)) with respect to the graphite particles, as determined according to an X-ray diffraction method, is, for example, preferably 5 nm or more, more preferably 10 nm or more, and preferably 300 nm or less, more preferably 200 nm or less. When the plane spacing ($d_{002}$) and the crystallite size (Lc(002)) satisfy the above respective ranges, the battery capacity of the secondary battery 10 tends to increase compared with the case where the above respective ranges are not satisfied.

Artificial graphite can be produced as follows, for example. Coke (precursor) serving as a main raw material is pulverized to a predetermined size, aggregated with an aggregating agent, and then pressure-molded into a block. The block is further graphitized by firing at a temperature of 2600° C. or more. The block molded body graphitized is pulverized and sieved to obtain graphite particles of a desired size. The internal porosity of the graphite particles can be adjusted here by the particle size of the precursor that has been pulverized, the particle size of the precursor that has been aggregated, and/or the like. The average particle size of the pulverized precursor is preferably, for example, in the range of 12 μm to 20 μm. The internal porosity of the graphite particles can also be adjusted by the amount of a volatile component added to the block molded product. When a portion of the aggregating agent added to the coke (precursor) volatilizes in firing, the aggregating agent can be used as a volatile component. Examples of such an aggregating agent include pitch.

Examples of the negative electrode active material included in the negative electrode mixture layer 32 include a metal to be alloyed with lithium, such as Si or Sn, or a material reversibly occluding and releasing lithium ions, such as an alloy or oxide including a metal element such as Si or Sn, in addition to the graphite particles described above. In the negative electrode mixture layer 32, the content of the graphite particles can be, for example, 90 mass % to 100 mass % based on the total amount of each of the negative electrode active materials.

The solid inorganic filler contained in the negative electrode mixture layer 32 is an inorganic filler having no internal pores or having few internal pores, and an example thereof is an inorganic filler having a BET specific surface area of 50 m$^2$/g or less. The hollow inorganic filler contained in the negative electrode mixture layer 32 is a porous inorganic filler having internal pores, and an example thereof is an inorganic filler having a BET specific surface area of 150 m$^2$/g or more. The BET specific surface area can be measured by a commercially available measurement apparatus, for example, Macsorb HM model-1201 or the like using nitrogen gas.

The solid inorganic filler or the hollow inorganic filler may be ceramic particles. Examples of the ceramic particles can include alumina, boehmite, and silica. The average particle size of the ceramic particles is preferably 0.5 μm to 3 μm, more preferably 0.8 μm to 2 μm.

In the negative electrode mixture layer 32, the solid inorganic filler and the hollow inorganic filler are disposed on the surface of the negative electrode active materials and in pores among the negative electrode active materials. The solid inorganic filler can suppress exudation of the electrolyte that has penetrated into pores among the active materials. The hollow inorganic filler contains the electrolyte in its internal pores. This can raise the rate at which the electrolyte penetrates the negative electrode mixture layer 32 when the negative electrode mixture layer 32 contracts with discharge. Meanwhile, the solid inorganic filler functions as a wedge to suppress slipping of the negative electrode active materials in the surface direction. This can suppress collapse of the pores among the active materials when the negative electrode mixture layer 32 expands with charge.

The negative electrode mixture layer 32 may further include a binder, a thickener, and the like. Examples of the binder include fluoro resins, PAN, polyimide resins, acrylic resins, polyolefin resins, styrene-butadiene rubber (SBR), and nitrile-butadiene rubber (NBR). Examples of the thickener include carboxymethyl cellulose (CMC) or salts thereof, poly(acrylic acid)(PAA) or salts thereof (PAA-Na, PAA-K. and the like which may be partially neutralized salts), and poly(vinyl alcohol)(PVA). These may be used singly or may be used in combinations of two or more thereof.

In the negative electrode mixture layer 32, there are a plurality of regions of differing volume change ratio upon charge and discharge (during charge and discharge) in the thickness direction of the layer. Specifically, when, with respect to the thickness direction of the negative electrode mixture layer 32, a range from the surface on the side of the negative electrode current collector 30 to 40% of the thickness of the negative electrode mixture layer 32 is defined as a first region 32a, and a range from the surface on the side opposite to the negative electrode current collector 30 to 40% of the thickness of the negative electrode mixture layer 32 is defined as a second region 32b, the first region 32a and the second region 32b have different volume change ratio upon charge and discharge. The volume change ratio of the first region 32a may be larger or smaller than the volume change ratio of the second region 32b. For example, when at least either one of the first region 32a and the second region 32b includes a Si material and the first region 32a and the second region 32b have different content of the Si material, the first region 32a and the second region 32b have different volume change ratio. The Si material, a material that can reversibly occlude and release lithium ions, functions as a negative electrode active material. Examples of the Si material include Si, an alloy including Si, and silicon oxide such as $SiO_x$(x is 0.8 to 1.6). The Si material is a negative electrode material that can enhance battery capacity more than graphite particles. The content of the Si material is, for example, preferably 1 mass % to 10 mass %, more preferably 3 mass % to 7 mass % based on the total amount of the negative electrode active materials in view of, for example, an enhancement in battery capacity and suppression of deterioration in high-speed charge-discharge cycle characteristics. As another example, when the graphite particles included in the first region 32a and the graphite particles included in second region 32b have a different degree of graphitization, the first region 32a and the second region 32b have different volume change ratio. Examples of a material having a high degree of graphitization can include natural graphite. In contrast, examples of a material having a low degree of graphitization can include artificial graphite such as hard carbon. The first region 32a and the second region 32b each may include one or two or more negative electrode active materials. There is no particular limitation on the combination of the materials as long as the regions have different volume change ratio upon charge and discharge.

In the first region 32a and the second region 32b, the region having the higher volume change ratio upon charge and discharge has a higher content of the solid inorganic filler and a lower content of the hollow inorganic filler than the region having the lower volume change ratio upon charge and discharge. That is, between the first region 32a and the second region 32b, the region having the higher volume change ratio upon charge and discharge has a higher content of the solid inorganic filler than that of the region having the lower volume change ratio upon charge and discharge, and the region having the lower volume change ratio upon charge and discharge has a higher hollow inorganic filler than that of the region having the higher volume change ratio upon charge and discharge. Inclusion of more of the solid inorganic filler in the region having the higher volume change ratio upon charge and discharge between the first region 32a and the second region 32 enables suppression of exudation of the electrolyte that has penetrated into pores among the negative electrode active materials. Additionally, inclusion of more of the hollow inorganic filler in the region having the lower volume change ratio upon charge and discharge between the first region 32a and the second region 32b enables enhancement of the rate at which the electrolyte is absorbed. As described above, when more of the solid inorganic filler is included in the region having the higher volume change ratio and more of the hollow inorganic filler is included in the region having the lower volume change ratio, each of the regions functions more effectively, and the high-speed charge and discharge characteristics are improved more than in the case where the hollow inorganic filler and the solid inorganic filler are present in admixture in one layer.

For example, 60 to 80 mass % of the solid inorganic filler are included in the region having the higher volume change ratio upon charge and discharge between the first region 32a and the second region 32b, based on the total amount of the inorganic fillers. For example, 60 to 80 mass % of the hollow inorganic filler are included in the region having the lower volume change ratio upon charge and discharge between the first region 32a and the second region 32b, based on the total amount of the inorganic fillers. In the first region 32a and the second region 32b, the inorganic fillers may be composed only of the solid inorganic filler or the hollow inorganic filler.

The total amount of the solid inorganic filler and the hollow inorganic filler included in the first region 32a and the second region 32b can be 1 mass % to 10 mass % based on the total amount of the graphite particles included in the first region 32a and the second region 32b. When the content of the inorganic filler is less than 1 mass %, the effect described above cannot be sufficiently obtained. When the content exceed 10 mass %, the battery resistance increases, and the output of the secondary battery 10 is lowered.

Next, an exemplary specific method for forming the negative electrode mixture layer 32 including the first region 32a and the second region 32b will be described. First, graphite particles, $SiO_x$ (x is 0.8 to 1.6), a solid inorganic filler, a thickener, a binder, and a solvent such as water are mixed to prepare a first negative electrode mixture slurry. Separately to this, graphite particles, a hollow inorganic filler, a thickener, a binder, and a solvent such as water are mixed to prepare a second negative electrode mixture slurry. Then, both sides of the negative electrode current collector are coated with the first negative electrode mixture slurry, the resultant coatings are dried, thereafter, both sides of the coating of the first negative electrode mixture slurry are coated with the second negative electrode mixture slurry, and the resultant coatings are dried. Further, the coatings can be rolled with a roller to thereby produce a negative electrode 12. The above method, while involving coating with the second negative electrode mixture slurry after coating with the first negative electrode mixture slurry and drying, may be a method involving coating with the second negative electrode mixture slurry after coating with the first negative electrode mixture slurry and before drying. The method may involve coating with the second negative electrode mixture slurry after coating with the first negative electrode mixture slurry, drying, and rolling the coatings.

[Positive Electrode]

The positive electrode 11 is configured from, for example, a positive electrode current collector of metal foil or the like, and a positive electrode mixture layer formed on the positive electrode current collector. Foil of a metal that is stable in the electric potential range of the positive electrode, such as aluminum, a film with such a metal disposed on an outer layer, and the like, can be used for the positive electrode current collector. The positive electrode mixture layer includes, for example, a positive electrode active material, a binder, and a conductive agent.

The positive electrode 11 can be produced by, for example, coating the positive electrode current collector with a positive electrode mixture slurry including, for example, a positive electrode active material, a binder, and a conductive agent, drying the resultant to thereby form the positive electrode mixture layer, and then rolling this positive electrode mixture layer.

Examples of the positive electrode active material can include a lithium/transition metal oxide containing a transition metal element such as Co, Mn or Ni. The lithium transition metal oxide is, for example, $Li_xCoO_2$, $Li_xNiO_2$, $Li_xMnO_2$, $Li_xCo_yNi_{1-y}O_2$. $Li_xCo_yM_{1-y}O_z$, $Li_xNi_{1-y}MyO_z$, $Li_xMn_2O_4$, $Li_xMn_{2-y}MyO_4$, $LiMPO_4$, or $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or a plurality thereof may be mixed and used. The positive electrode active material preferably includes a lithium/nickel complex oxide such as $Li_xNiO_2$, $Li_xCo_yNi_{1-y}O_2$, $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint that the capacity of the non-aqueous electrolyte secondary battery can be increased.

Examples of the conductive agent include carbon particles such as carbon black (CB), acetylene black (AB), Ketjenblack. and graphite. These may be used singly or may be used in combinations of two or more thereof.

Examples of the binder include fluoro resins such as polytetrafluoroethylene (PTFE) and poly(vinylidene fluoride) (PVdF), polyacrylonitrile (PAN), polyimide resins, acrylic resins, and polyolefin resins. These may be used singly or may be used in combinations of two or more thereof.

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene (PE) and polypropylene (PP), and cellulose. The separator 13 may be a laminate including a cellulose fiber layer and a layer of fibers of a thermoplastic resin such as an olefin resin. The separator may be a multi-layered separator including a polyethylene layer and a polypropylene layer, and a surface of the separator 13 to be used may be coated with a material such as an aramid resin or ceramic.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolyte), and may be a solid electrolyte using a gel polymer or the like. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least a portion of hydrogen of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC, ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, petyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiACl_4$, $LiSCN$, $LiCF_3SO_3$, $UCF_3CO_2$, $Li(P(C_2O_4)F_4)$, $LiPF_{6-x}(CnF_{2n+1})_x$ (where $1<x<6$, and n is 1 or 2), $LiB_{10}Cl_{10}$, LiCl, LiBr, LiI, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(C_1F_{2i+1}SO_2)(C_mF_{2m+1}SO_2)$ (where l and m are integers of 1 or more). These lithium salts may be used singly or a plurality thereof may be mixed and used. Among these, $LiPF_6$ is preferably used in view of ionic conductivity, electrochemical stability, and other properties. The concentration of the lithium salt is preferably 0.8 to 1.8 mol per liter of the solvent.

EXAMPLES

Hereinafter, the present disclosure will be further described with reference to Examples, but the present disclosure is not intended to be limited to such Examples.

Example 1

[Production of Positive Electrode]

A lithium/nickel/cobalt/manganese composite oxide ($LiNi_{0.88}Co_{0.09}Mn_{0.03}O_2$) is used as a positive electrode active material. Mixed are 100 parts by mass of the positive electrode active material, 1 part by mass of acetylene black as a conductive agent, and 0.9 parts by mass of a poly(vinylidene fluoride) powder as a binder, and an appropriate amount of N-methyl-2-pyrrolidone (NMP) is further added thereto to prepare a positive electrode mixture slurry. Both sides of a positive electrode current collector made of aluminum foil (thickness 15 μm) are coated with the slurry by a doctor blade method, and the resultant coatings are dried and then rolled with a roller to thereby produce a positive electrode in which a positive electrode mixture layer is formed on both the sides of the positive electrode current collector.

[Production of Negative Electrode]

Artificial graphite is used as graphite particles. Alumina having a BET specific surface area of 5 $m^2/g$ is used as a solid inorganic filler, and porous silica having a BET specific surface area of 300 $m^2/g$ is used as a hollow inorganic filler. Artificial graphite, SiO, alumina, carboxymethyl cellulose (CMC), and styrene-butadiene copolymer rubber (SBR) are mixed such that the mass ratio thereof is 95:5:5:1:1, and the admixture thereof is kneaded in water to thereby prepare a first negative electrode mixture slurry. Artificial graphite, porous silica, carboxymethyl cellulose (CMC), and styrene-butadiene copolymer rubber (SBR) are mixed such that the mass ratio thereof is 95:5:1:1, and the admixture thereof is kneaded in water to thereby prepare a second negative electrode mixture slurry.

After both sides of a negative electrode current collector made of copper foil are coated with the first negative electrode mixture slurry by a doctor blade method, the resulting coatings are dried, the coatings are coated with the second negative electrode mixture slurry, and the resultant coatings are dried to thereby form a negative electrode mixture layer. At this time, the coating mass ratio per unit area between the first negative electrode mixture slurry and the second negative electrode mixture slurry is 5:5. The negative electrode mixture layer is rolled with a roller to thereby produce a negative electrode.

[Preparation of Non-Aqueous Electrolyte]

Ethylene carbonate (EC), methyl ethyl carbonate (MEC), and dimethyl carbonate (DMC) are mixed at a volume ratio of 20:40:40. Lithium hexafluorophosphate ($LiPF_6$) is dissolved at a concentration of 1 mol/liter in the mixed solvent to thereby prepare a non-aqueous electrolyte.

[Production of Test Cell]

An aluminum lead is attached to the above positive electrode, a nickel lead is attached to the above negative electrode, and the positive electrode and the negative electrode are laminated with a PP/PE/PP three-layer separator therebetween to produce a laminate electrode assembly. This electrode assembly is housed in an exterior body made of an aluminum-laminated sheet, the non-aqueous electrolyte is injected thereto, and then, the opening of the exterior body is sealed to thereby obtain a test cell.

[Evaluation of Initial Battery Resistance]

The above test cell is charged at a constant current of 0.3 C under an environment of 25° C. until the state of charge (SOC) reaches 50%. After the SOC reaches 50%, charging at a constant voltage is camed out until the current value reaches 0.02 C. Then, after storage under an environment at 25° C. for an hour, discharging at a constant current of 1 C is carried out for 10 seconds. The direct current resistance is calculated by dividing the difference between the open circuit voltage (OCV) and the closed circuit voltage (CCV) 10 seconds after discharging by the discharge current 10 second after discharging, as in the following expression.

Direct current resistance=[OCV–CCV (10 seconds after discharging)]/Discharge current (10 seconds after discharging)

[Measurement of Resistance Increase Ratio]

The above test cell is charged at a constant voltage under an environment of 25° C. until the state of charge (SOC) reaches 60%. Then, after charging at a constant current of 2 C is carried out for 400 seconds, discharging at a constant current of 1 C is camed out for 800 seconds. Such charge and discharge are defined as one cycle, and performed for 500 cycles. The test cell after 500 cycles is evaluated for the above battery resistance. Then, the resistance increase ratio in high-speed charge-discharge cycles is determined according to the following expression.

Resistance increase ratio=(Battery resistance at 500th cycle/Battery resistance at first cycle (initial battery resistance))×100

Example 2

A test cell is produced and evaluated in the same manner as in Example 1 except that both sides of the negative electrode current collector are coated with the second negative electrode mixture slurry and the coatings are further coated with the first negative electrode mixture slurry.

Comparative Example 1

A test cell is produced and evaluated in the same manner as in Example 1 except that no alumina is added to the first negative electrode mixture slurry and no porous silica is added to the second negative electrode mixture slurry.

Comparative Example 2

A test cell is produced and evaluated in the same manner as in Example 1 except that no alumina is added to the first negative electrode mixture slurry and the composition of the second negative electrode mixture slurry is such that the mass ratio of graphite:alumina:porous silica is 95:5:5.

Comparative Example 3

A test cell is produced and evaluated in the same manner as in Example 1 except that the composition of the first negative electrode mixture slurry is such that the mass ratio of graphite:alumina:porous silica is 95:5:5 and no porous silica is added to the second negative electrode mixture slurry.

Comparative Example 4

A test cell is produced and evaluated in the same manner as in Example 1 except that graphite, alumina, and porous silica are mixed such that the mass ratio of graphite:alumina:porous silica is 95:5:50, the resulting admixture is kneaded in water to prepare a negative electrode mixture slurry, both sides of a negative electrode current collector made of copper foil are coated with the slurry by a doctor blade method, and the resulting coatings are dried and rolled to produce a negative electrode.

Comparative Example 5

A test cell is produced and evaluated in the same manner as in Example 1 except that porous silica is replaced by alumina in the second negative electrode mixture slurry.

Comparative Example 6

A test cell is produced and evaluated in the same manner as in Example 1 except that alumina is replaced with porous silica in first negative electrode mixture slurry.

The evaluation results of the test cells of Examples and Comparative Examples are summarized in Table 1. The compositions other than CMC and SBR (component and proportion) of the first region and the second region are also shown in Table 1.

TABLE 1

| | Negative electrode (mass ratio in the parentheses) | | Resistance increase ratio (%) | Initial battery resistance (mΩ) |
|---|---|---|---|---|
| | First region [collector side] | Second region [outer surface side] | | |
| Example 1 | Graphite/SiO/alumina (95/5/5) | Graphite/porous silica (95/5) | 105 | 129 |
| Example 2 | Graphite/porous silica (95/5) | Graphite/SiO/alumina (95/5/5) | 103 | 125 |
| Comparative Example 1 | Graphite/SiO (95/5) | Graphite | 145 | 128 |
| Comparative Example 2 | Graphite/SiO (95/5) | Graphite/alumina/porous silica (95/5/5) | 135 | 127 |
| Comparative Example 3 | Graphite/alumina/porous silica (95/5/5) | Graphite | 142 | 131 |
| Comparative Example 4 | Graphite/alumina/porous silica (95/5/5) | | 153 | 129 |
| Comparative Example 5 | Graphite/SiO/alumina (95/5/5) | Graphife/alumina (95/5) | 128 | 125 |
| Comparative Example 6 | Graphite/SiO/porous silica (95/5/5) | Graphite/porous silica (95/5) | 132 | 127 |

In Examples 1 and 2, in which the resistance has not increased after the cycle test in comparison with that of Comparative Examples 1 to 6, deterioration of the high-speed charge-discharge cycle characteristics can be suppressed. The initial battery resistance is confirmed to be substantially equivalent in Examples and Comparative Examples.

REFERENCE SIGNS LIST

10 secondary battery. 11 positive electrode, 12 negative electrode, 13 separator, 14 electrode assembly, 15 exterior body, 16 sealing assembly, 17, 18 insulating plate, 19 positive electrode lead, 20 negative electrode lead, 21 grooved portion, 22 filter, 23 lower vent member, 24 insulating member, 25 upper vent member, 26 cap, 26a opening, 27 gasket. 30 negative electrode current collector, 32 negative electrode mixture layer, 32a first region, 32b second region.

The invention claimed is:

1. A negative electrode for a non-aqueous electrolyte secondary battery, comprising:
   a negative electrode current collector; and
   a negative electrode mixture layer provided on a surface of the negative electrode current collector, wherein
   the negative electrode mixture layer includes at least graphite particles, a solid inorganic filler, and a hollow inorganic filler,
   when, with respect to a thickness direction of the negative electrode mixture layer, a range from a surface on a side of the negative electrode current collector to 40% of a thickness of the negative electrode mixture layer is defined as a first region, and a range from a surface on an a side opposite to the negative electrode current collector to 40% of the thickness of the negative electrode mixture layer is defined as a second region,
   the first region and the second region have different volume change ratio upon charge and discharge, and
   in the first region and the second region, the region having a higher volume change ratio upon charge and discharge has a higher content of the solid inorganic filler and a lower content of the hollow inorganic filler than the region having a lower volume change ratio upon charge and discharge.

2. The negative electrode for a non-aqueous electrolyte secondary battery according to claim 1, wherein
the solid inorganic filler and the hollow inorganic filler are ceramic particles.

3. The negative electrode for a non-aqueous electrolyte secondary battery according to claim 1, wherein
a total amount of the solid inorganic filler and the hollow inorganic filler included in the first region and the second region is 1 mass % to 10 mass % based on a total amount of the graphite particles included in the first region and the second region.

4. The negative electrode for a non-aqueous electrolyte secondary battery according to claim 1, wherein
the negative electrode mixture layer further includes a Si material in at least either one of the first region and the second region, and
the first region and the second region are different in a content of the Si material.

5. The negative electrode for a non-aqueous electrolyte secondary battery according to claim 1, wherein
the graphite particles included in the first region and the graphite particles included in the second region are different in a degree of graphitization.

6. A non-aqueous electrolyte secondary battery comprising:
the negative electrode for a non-aqueous electrolyte secondary battery according to claim 1;
a positive electrode; and
a non-aqueous electrolyte.

* * * * *